(12) United States Patent
Perkins et al.

(10) Patent No.: US 10,614,248 B2
(45) Date of Patent: Apr. 7, 2020

(54) PRIVACY PRESERVING CROSS-ORGANIZATIONAL DATA SHARING WITH ANONYMIZATION FILTERS

(71) Applicant: CA, Inc., New York, NY (US)

(72) Inventors: James Andrew Perkins, Fort Collins, CO (US); Nicholas D. Thayer, Loveland, CO (US); Corey Adam Cohen, Matawan, NJ (US)

(73) Assignee: CA, Inc., New York, NY (US)

( * ) Notice: Subject to any disclaimer, the term of this patent is extended or adjusted under 35 U.S.C. 154(b) by 492 days.

(21) Appl. No.: 15/421,331

(22) Filed: Jan. 31, 2017

(65) Prior Publication Data

US 2018/0218173 A1  Aug. 2, 2018

(51) Int. Cl.
*G06F 17/30* (2006.01)
*G06F 21/62* (2013.01)
*H04L 29/06* (2006.01)

(52) U.S. Cl.
CPC ...... *G06F 21/6254* (2013.01); *H04L 63/0421* (2013.01)

(58) Field of Classification Search
CPC .................................................. G06F 21/6254
USPC .................................. 707/714, 763, 999.103
See application file for complete search history.

(56) References Cited

U.S. PATENT DOCUMENTS

| 6,167,427 | A * | 12/2000 | Rabinovich | ......... H04L 67/1002 |
| | | | | 707/999.202 |
| 7,814,229 | B1 * | 10/2010 | Cabrera | .............. H04L 61/1511 |
| | | | | 709/228 |
| 2016/0119341 | A1 | 4/2016 | Williams et al. | |

OTHER PUBLICATIONS

Shi, et al., "Anonymizing Data with Quasi-Sensitive Attribute Values", CIKM'10, Oct. 2010, 4 pages, retrieved on Jan. 1, 2017 from http://www.mathcs.emory.edu/aims/pub/cikm2010.pdf.
Stringer, "Protecting Personally Identifiable Information: What Data Is at Risk and What You Can Do About It", Sophos, A Sophos White Paper, Oct. 2011, 6 pages, retrieved on Dec. 29, 2016 from https://www.sophos.com/en-us/medialibrary/pdfs/other/sophosprotectingpii.pdf.
Sweeney, "k-Anonymity: A Model for Protecting Privacy", International Journal on Uncertainty, Fuzziness and Knowledge-based Systems, 2002, pp. 557-570, retrieved on Jan. 1, 2017 from https://epic.org/privacy/reidentification/Sweeney_Article.pdf.

(Continued)

*Primary Examiner* — Baoquoc N To
(74) *Attorney, Agent, or Firm* — Foley & Lardner LLP

(57) ABSTRACT

A system can be designed that shares transaction data across different organizations while preserving data privacy and anonymizing the source organization. Organizations can enter into an agreement to share transaction data with each other through a trusted data sharing system. The organizations can input user records that include primary and secondary explicit user identifiers into the data sharing system. The data sharing system can correlate explicit user identifiers of a user across organizations via an internal identifier without exposing explicit user identifiers. The data sharing system comprises a data anonymizer agent for each sharing organization. A data anonymizer agent selectively applies anonymization filters to quasi-identifiers in the transaction data based on quasi-identifier type to extend data privacy protection measures to quasi-identifiers without drastically reducing or eradicating the utility of the quasi-identifiers.

20 Claims, 7 Drawing Sheets

(56) References Cited

OTHER PUBLICATIONS

Tripp, "Managing the Anonymous to Authenticated Customer Experience", Digital Marketing Blog, Campaign Management, Sep. 9, 2015, 4 pages, retrieved on Jan. 1, 2017 from https://blogs.adobe.com/digitalmarketing/campaign-management/managing-the-anonymous-to-authenticated-customer-experience/.

* cited by examiner

US 10,614,248 B2

PRIVACY PRESERVING CROSS-ORGANIZATIONAL DATA SHARING WITH ANONYMIZATION FILTERS

BACKGROUND

The disclosure generally relates to the field of information security, and more particularly to multicomputer data transferring.

Organizations collect data about customers or clients to improve the data available for data mining. A customer will often create an account with identifying information, such as name, e-mail, address, and phone number. An organization then maintains transaction data by the created account. An organization may use the collected data to target advertisements, tailor offers, and/or improve user experience. The account information is personally identifiable information (PII). In the NIST Special Publication 800-122, the National Institute of Standards and Technology defines PII as "any information about an individual maintained by an agency, including (1) any information that can be used to distinguish or trace an individual's identity, such as name, social security number, date and place of birth, mother's maiden name, or biometric records; and (2) any other information that is linked or linkable to an individual, such as medical, educational, financial, and employment information. An element of information that alone can be used to identify someone is referred to as an explicit identifier. An element of information that can be linked or combined with another element of information to identify someone is referred to as a quasi-identifier or quasi-identifying information. The collected transaction data can include quasi-identifiers. The failure of an organization to protect PII harms individuals as well as the organization since the failure can impact an organization's reputation, incur legal liability, and/or remediation costs.

Organizations use de-identification or anonymization of PII to preserve privacy of individuals. The International Association of Privacy Professionals (IAPP) defines de-identification as an action taken to remove identifying characteristics from data. The IAPP defines anonymization as a process of altering identifiable data in such a way that it no longer can be related back to a given individual. Anonymization techniques include removing identifying values from data (suppression), making identifying values broader (generalization), and swapping identifying values of individuals within a data set (noise addition).

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

Overview

Sharing transaction data across organizations can increase the number of perspectives of user behavior. The greater number of perspectives can facilitate more fruitful data mining and/or drive different analysis of the data. For instance, additional shared data can reveal previously undiscovered relationships between user behaviors across different organizations, such as web browsing behavior at an online retailer and brick and mortar shopping behavior. The transaction data likely includes PII, which organizations continually strive to protect to preserve data privacy. Organizations will often de-identify explicit identifiers and instead use an identifier that identifies data or a data record (e.g., use a hash of an e-mail address or username) but does not identify an individual and cannot be related back to an individual. With data sharing, a greater diversity of data may be available and increase the possibility of combining quasi-identifiers to identify an individual. A quasi-identifier can be anonymized, but may be rendered useless if anonymized with certain anonymization techniques.

A system can be designed that shares transaction data across different organizations while preserving data privacy and anonymizing the source organization. Organizations can enter into an agreement to share transaction data with each other through a trusted data sharing system. The organizations can input user records that include primary and secondary explicit user identifiers into the data sharing system. The data sharing system can correlate explicit user identifiers of a user across organizations via an internal identifier without exposing explicit user identifiers. The data sharing system comprises a data anonymizer agent for each sharing organization. A data anonymizer agent selectively applies anonymization filters to quasi-identifiers in the transaction data based on quasi-identifier type to extend data privacy protection measures to quasi-identifiers without drastically reducing or eradicating the utility of the quasi-identifiers. This can be done before ingest into the data sharing system to prevent a quasi-identifier from traveling out of a zone of control of the collecting/owning organization. Each of the anonymization filters can be tuned by data collector/owner to satisfy a desired level of data protection and an agreed upon minimum level of specificity to allow for useful analysis.

Example Illustrations

Figure 1:
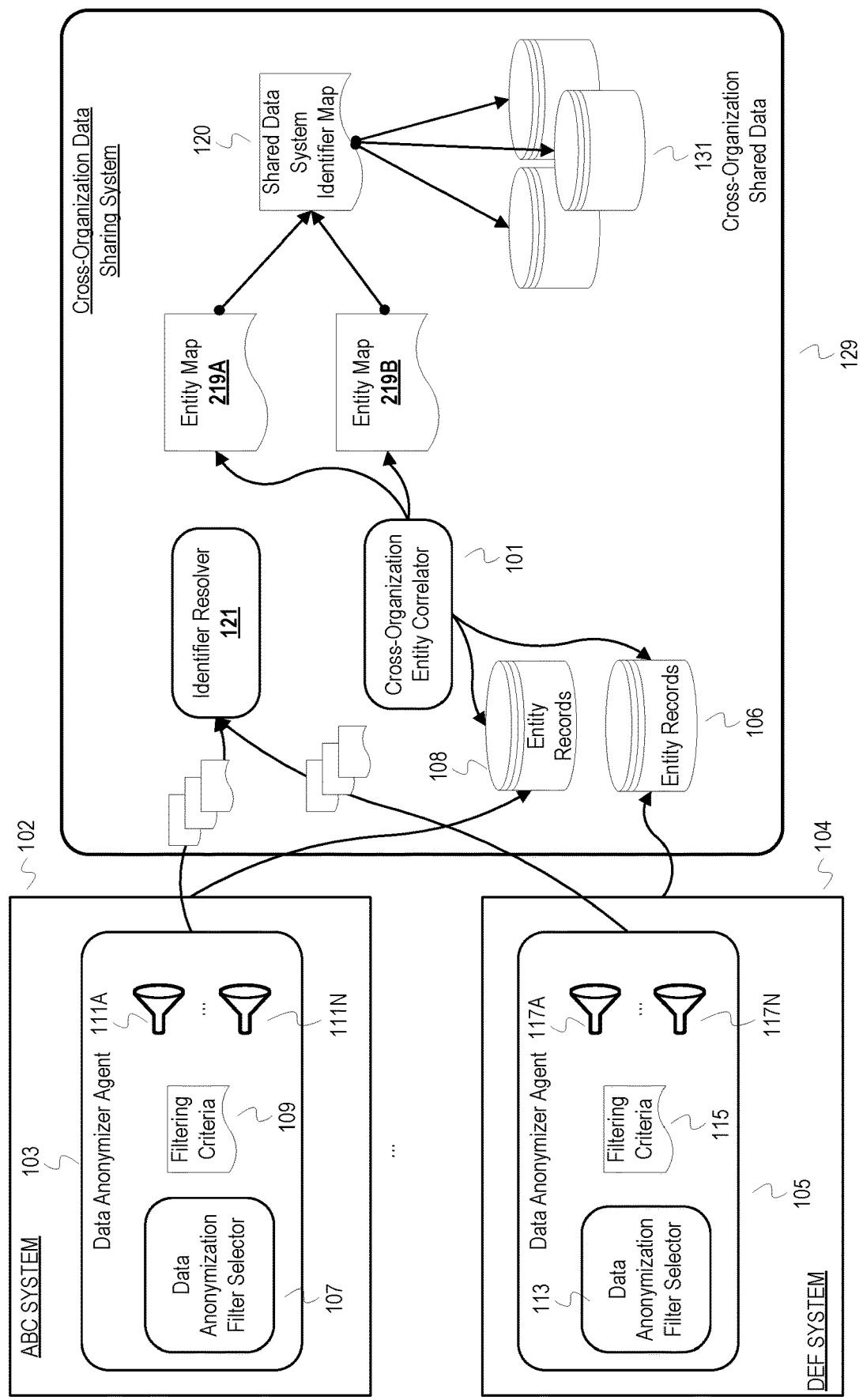
FIGS. 1-2 depict conceptual examples a cross-organization data sharing system.
Figure 2:
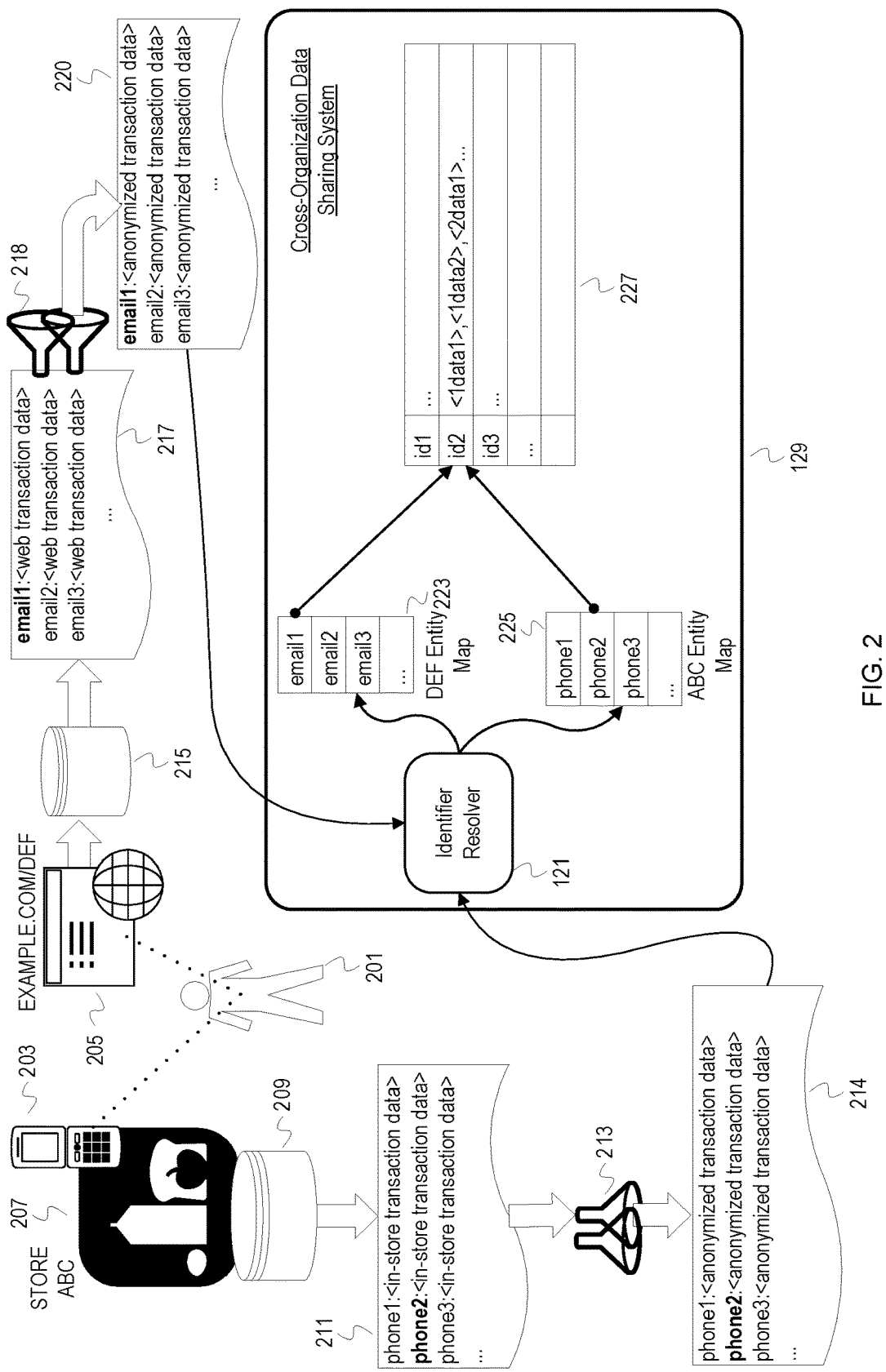

FIGS. 1-2 depict conceptual examples a cross-organization data sharing system. FIG. 1 depicts example components of a cross-organization data sharing system ("data sharing system") 129 and structures for establishing mappings between identifiers of sharing organizations to shared transaction data without exposing quasi-identifiers, such as identity of a source organization (i.e., source of transaction data to be shared). FIG. 2 further depicts an example ingest of transaction data into the data sharing system 129 from two of the sharing organizations. For the example Figures, it is presumed that organizations have already entered into an agreement to share transaction data through the data sharing system 129. Another presumption underlying the illustrations is that user records are created from information provided by users to at least some of the sharing organizations. For instance, an online account is created with at least two of the sharing organizations from information provided by a user, such as an e-mail address, name, and phone number. Although a user may intentionally provide incorrect information (e.g., an incorrect birth date and phone number), transaction data will be associated with the account and correspond to the user. Thus, the collection of explicit identifiers (e.g., phone number, e-mail address, and name) can still be considered as identifying the user regardless of identifier accuracy. Further, different organizations may collect different sets of explicit identifiers. For instance, one organization may collect name, phone number, and e-mail address, and another organization may only collect e-mail address.

In FIG. 1, an organization ABC has a system 102 and an organization DEF has a system 104. The systems 102, 104 include various software and hardware components (e.g., databases, servers, etc.) that collect transaction data of users/customers of the respective organizations. Within the system 102, a data anonymizer agent 103 has been deployed. Within the system 104, a data anonymizer agent 105 has been deployed. If the case of a distributed system that collects transaction data for an organization, data anonymizer agents can be deployed at each point of the distributed system that provides collected transaction data. The systems 102, 104 may collect transaction data from web servers, point of sale devices or applications on point of sale devices, applications on mobile devices, etc.

The data anonymizer agents 103, 105 selectively apply anonymization filters to transaction data before communicating the anonymized transaction data to the data sharing system 129. The data anonymizer agent 103 comprises a data anonymization filter selector 107 and anonymization filters 111A-111N. The data anonymization filter selector 107 selects from the data anonymization filters 111A-111N based on filtering criteria 109. The filtering criteria 109 specifies which of the anonymization filters 111A-111N to apply to a value or element of transaction data, such as quasi-identifiers within transaction data. The filtering criteria 109 can be defined by an administrator of ABC. The filtering criteria 109 may be generated based on one or more data privacy policies for ABC across different jurisdictions. For instance, the filtering criteria 109 can specify an anonymization filter that reduces granularity of geographic information to different degrees depending upon the jurisdiction where the transaction data was collected (e.g., eliminate street number of a physical address in jurisdiction X and replace a physical address with a postal code in jurisdiction Y). Assuming the transaction data is structured, the data anonymization filter selector 107 can select an anonymization filter based on a tag that identifies a type of data (e.g., type of quasi-identifier) or location of the data element within the transaction data. If transaction data is unstructured, a data anonymizer agent can also include or invoke program code that parses and analyzes unstructured transaction to identify quasi-identifiers and/or determine data elements and types. The transaction data may also be semi-structured. As with the data anonymizer agent 103, the data anonymizer agent 105 comprises a data anonymization filter selector 113 and anonymization filters 117A-117N. The filter selector 113 selects from the anonymization filters 117A-117N based on transaction data and filtering criteria 115. The filtering criteria 115 is defined or configured for the organization DEF.

Prior to communication of transaction data to the data sharing system 129, the organizations provide user records to the data sharing system 129. The data sharing system 129 comprises a cross-organization entity correlator 101 and an identifier resolver 121. The correlator 101 correlates user/entity records from sharing organizations. The correlator 101 creates maps 219A-219B that associate entity records from sharing organizations with respective identifiers of the data sharing system 129 ("internal identifiers") and a data sharing system identifier map 120 that associates the internal identifiers with cross-organization shared data 131. In FIG. 1, user records from ABC are depicted as a set of entity records 108 and user records from DEF are depicted as a set of entity records 106. Each user record comprises a primary explicit identifier used by the source organization (i.e., an explicit identifier used as an index or key for the user record) and one or more secondary explicit identifiers collected by the source organization. For instance, ABC may use a username created for an account as a primary explicit identifier and a phone number as a secondary explicit identifier. After receiving customer records from sharing organizations, the data sharing system 129 correlates customer records based on the explicit identifiers to determine customer records from different sharing organizations that (most likely) identify a same user. Based on correlations, the data sharing system 129 generates the internal identifiers for different entities and maps entity records corresponding to a same entity/user to the respective one of the internal identifiers.

The data anonymizer agents 103, 105 communicate anonymized transaction data sets to the data sharing system 129 based on scheduled uploads and/or explicit triggers (e.g., occurrence of an event or manually triggered upload). The data sharing system 129 aggregates transaction data from different organizations for a same user based on the created mappings. Transaction data records within an anonymized transaction data set from an organization will indicate the primary explicit identifiers used by the organization. The identifier resolver 121 resolves the primary explicit identifiers indicated in the transaction records to corresponding internal identifiers with the one of the entity maps 219A-219B that corresponds to the source organization. The identifier resolver 121 can then update entries in the cross-organization shared data 131 referenced by the internal identifiers with the transaction data. The cross-organization shared data 131 may be distributed across different storage systems for different jurisdictions to comply with jurisdictional data privacy laws. FIG. 1 depicts data anonymizer agents to anonymize transaction data deployed at source organization systems. However, a data sharing system can be designed that allows for raw transaction data to be communicated from organizations and anonymized at ingest into the data sharing system.

FIG. 2 depicts example ingest of anonymized transaction data from two sharing organizations into the data sharing system 129. In FIG. 2, the sharing organizations include a brick mortar store ABC 207 and an online organization DEF. The store ABC 207 can collect transaction data from customers with store accounts from point of sale devices and mobile device applications. The online organization DEF collects data of users with online accounts when interacting with a website 205 at www.example.com/DEF. The store ABC collects transaction data into a data store 209 as transaction records. The organization DEF collects transaction data into a data store 205 as transaction records. Periodically, both organizations upload at least some of the transaction data of the transaction records to the data sharing system 129.

For the illustration of FIG. 2, a user 201 has interacted with the DEF website 205 and has shopped in the store ABC 207. The DEF organization uses an e-mail address "e-mail1" as a primary explicit identifier of the user 201. The store ABC uses a phone number "phone2" as a primary explicit identifier of the user 201. The store ABC collected transaction data from an application on a mobile device 203 of the user 201 and the collected transaction data was bound to phone2. This transaction data can include data about how the user 201 interacted with the application. When the user 201 purchased items in the store ABC 207, a point of sale device or application on the point of sale device captured transaction data bound to phone2. The transaction data related to the user 201 is stored into the data store 209 along with other transaction data. At a scheduled time, a data anonymizer agent associated with store ABC 207 selectively applies anonymization filters 213 to transaction data set 211 to generate anonymized transaction data set 214 with each transaction record within the anonymized transaction data set 214 still identified by the primary explicit identifier used by the store ABC 207. The anonymized transaction data set 214 is communicated to the data sharing system 129. The transaction data of the user 201 collected by the organization DEF undergoes a similar process. The website 205 collects data about how the user 201 interacts with the website 205 and records it into the data store 215 along with other transaction data of other users. Based on a schedule or explicit request, a data anonymizer agent associated with DEF selectively applies anonymization filters 218 to the web transaction data set 217 to generate anonymized transaction data set 220. The anonymized transaction data set 220 is then communicated to the data sharing system 129.

The data sharing system 129 resolves primary explicit identifiers of the transaction records to internal identifiers to aggregate transaction data for a same user across different organizations. The identifier resolver 121 uses an entity map 223 of the DEF organization to resolve email1 to the internal identifier "id2" and updates an entry referenced by id2 with the transaction record identified by email1 within the anonymized transaction data set 220. The identifier resolver 121 uses an entity map 225 of the ABC organization to resolve phone2 to the internal identifier "id2" and updates the entry referenced by id2 with the transaction record identified by phone2 within the anonymized transaction data set 214. At some point prior, the data sharing system 129 correlated the user records provided by ABC and DEF and deemed email1 and phone2 as identifying a same entity. With the transaction data of ABC and DEF aggregated for the user 201, each organization can analyze/mine the aggregated transaction data to reveal possible relationships between activity on the website 205 and in the store 207. For instance, it may be discovered that the user 201 tends to purchase certain types of items in a physical store if not available within a short time period from an online retailer. The transaction data will be anonymized so that DEF will not be aware that the user 201 purchased an item at the store 207. But the organizations may have agreed to sharing transaction data with a degree of information that allows a transaction to be related to a physical versus online source.

The following flowcharts provide example operations based on presumed implementation choices but are not bound to a particular use case as in the example illustrations of FIG. 1 and FIG. 2. The flowcharts are provided to aid in understanding embodiments and are not to be used to limit the scope of the claims.

Figure 3:
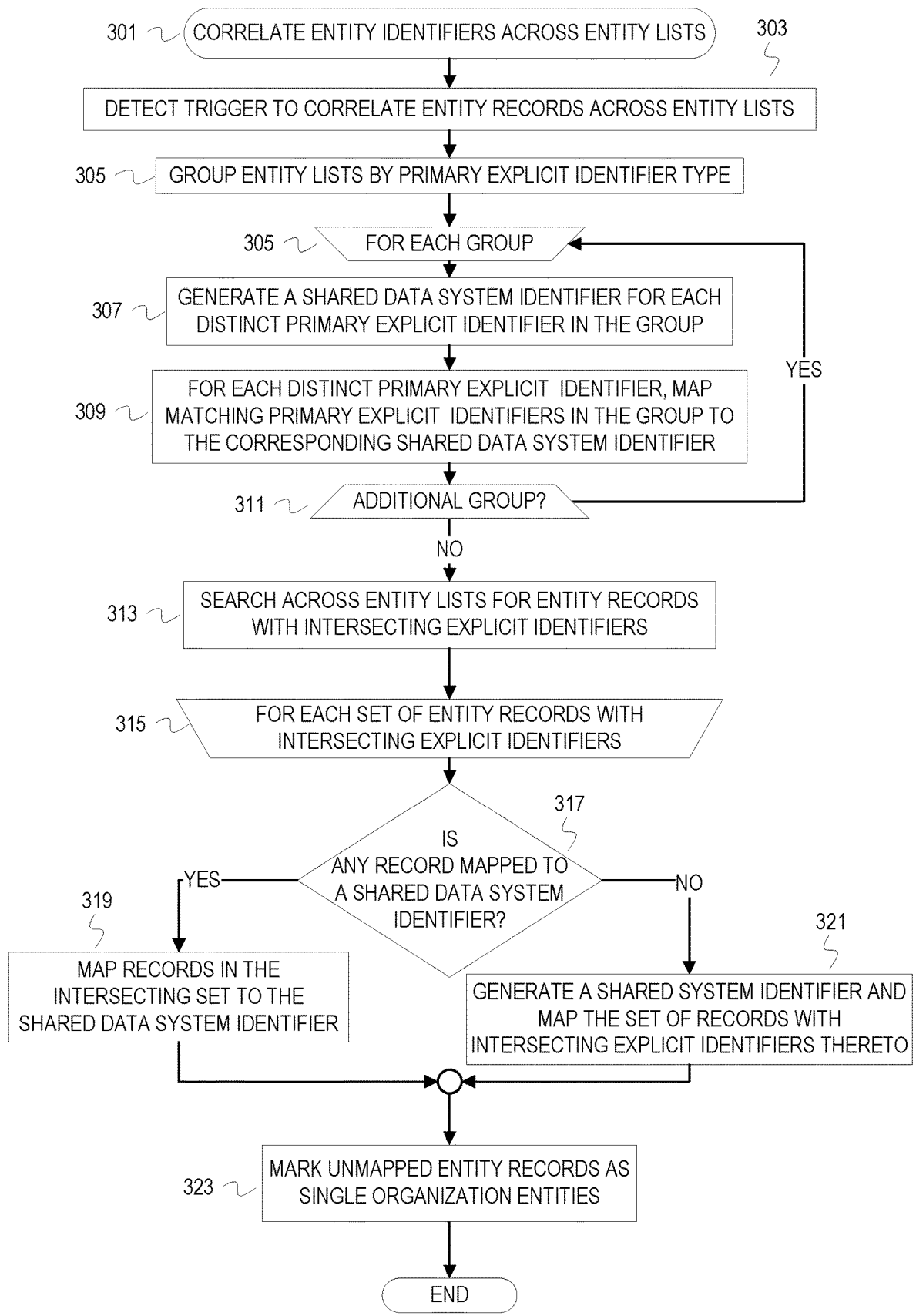
FIG. 3 is a flowchart of example operations for correlating entity identifiers across entity lists provided to a data sharing system.

FIG. 3 is a flowchart of example operations for correlating entity identifiers across entity lists provided to a data sharing system. FIG. 3 refers to a correlator performing the example operations for consistency with the previous example illustrations. The naming throughout is for convenience in explaining embodiments. Program code to carry out embodiments can vary in form (e.g., degree of modularization) and function depending upon platform, developer/programmer choices, programming language, etc. The correlator correlates entity identifiers across entity lists from different organizations that are members or participants in the cross-organizational data sharing. This allow aggregation of transaction data for a same user across different organization sources despite the organizations using different primary explicit identifiers.

A trigger initiates correlation of entity records across entity lists (301). A trigger can take various forms. Examples of a trigger include expiration of a time period according to a correlation schedule, detection of receipt of entity lists from at least two member organizations, detection of completion of an organization enrollment phase, an explicit request from an administrator for correlation across entity lists, etc.

Based on detection of the trigger, a correlator groups entity lists by primary explicit identifier type (303). For instance, the correlator groups together entity lists that use e-mail addresses as primary explicit identifiers and groups together entity lists that use phone numbers. The correlator can be programmed to group together entity lists that use explicit identifier types less likely to be globally unique, such as usernames. A correlator may be programmed to group together entity lists that use these types of explicit identifiers based on heuristics or default assumptions that entities will commonly create a same username across organizations. As one example of grouping together entity lists, the correlator can create a data structure that identifies entity lists that use a same type of primary explicit identifier. To determine types of primary explicit identifiers, the correlator examines the entity lists. Regardless of particular list implementation (e.g., a text document, an eXtensible markup language file, a database, etc.), the entity lists are structured and include tags or fields that indicate identifier type. A data sharing system may require organizations to provide entity lists that comply with a specification for efficient evaluation.

Within each entity list group, the correlator correlates entities based on primary explicit identifiers (305). The correlator determines the distinct primary explicit identifiers within the group and generates a data sharing system identifier ("internal identifier") for each distinct primary explicit identifier. The correlator can create copies of the entity lists with an additional field to mark those that are distinct or create a separate data structure of primary explicit identifiers when first encountered as the correlator traverses the entity records of the entity lists within the group. For each distinct primary explicit identifier, the correlator maps matching instances of the primary explicit identifier to the shared system identifier generated for the distinct primary explicit identifier (309). In an example embodiment, the correlator can iterate over each entity record of each entity list within a group and populate a data structure with first instances of primary explicit identifiers. The correlator generates the shared system identifier for the first instances and maps the generated shared system identifier to the entity record corresponding to the first instance. After processing the first selected entity list within a group, the correlator will search the data structure of first instance primary explicit identifiers for matches when iterating over the primary explicit identifiers of subsequently selected lists within the group. When a subsequent instance of a primary explicit identifier is encountered, the correlator maps the entity record corresponding to the subsequent instance to the shared system identifier generated for the matching first instance primary explicit identifier. The correlator correlates across entity lists within each group of entity lists (311).

After correlating based on primary explicit identifiers, the correlator searches across entity records of the entity lists for intersecting identifiers (313). As previously mentioned, an entity list comprises entity records, each of which likely includes a primary explicit identifier and at least one secondary explicit identifier. Although organizations may use different primary explicit identifiers, the organizations may have intersections between secondary explicit identifiers and between primary and secondary explicit identifiers. An "intersection" of explicit identifiers refers to a match of at least one explicit identifier between different entity lists. For instance, an organization that uses e-mail addresses as primary explicit identifiers may have also been provided from an entity a phone number. Another organization may have the same phone number as either a primary or a secondary explicit identifier.

For each set of entity records with intersecting explicit identifiers, the correlator maps intersecting entity records to a corresponding shared system identifier (315). Similar to the grouping of entity lists based on same types of primary explicit identifiers, the correlator can create groups or sets of entity records from different entity lists based on intersecting explicit identifiers. The correlator determines whether an entity record within an intersection set is already mapped to a shared system identifier (317). If so, then the correlator maps the other entity records of that intersection set to the shared system identifier (319). If none of the records in the intersection set are mapped to a shared system identifier, then the correlator generates a shared system identifier and maps each record in the intersection set to the generated shared system identifier (321).

If there are entity records that remain unmapped to a shared system identifier, the correlator marks those unmapped entity records as single organization entities (323). The correlator can add a field or flag to the unmapped entity records to indicate the represented entity has not been found in another entity list. The correlator can also maintain a listing (e.g., file, in-memory data structure, etc.) that identifies the unmapped entity records. The indication of unmapped entity records can be used for selective correlation and/or helping preventing sharing of transaction data for an entity that is not known to more than one member organization.

Figure 4:
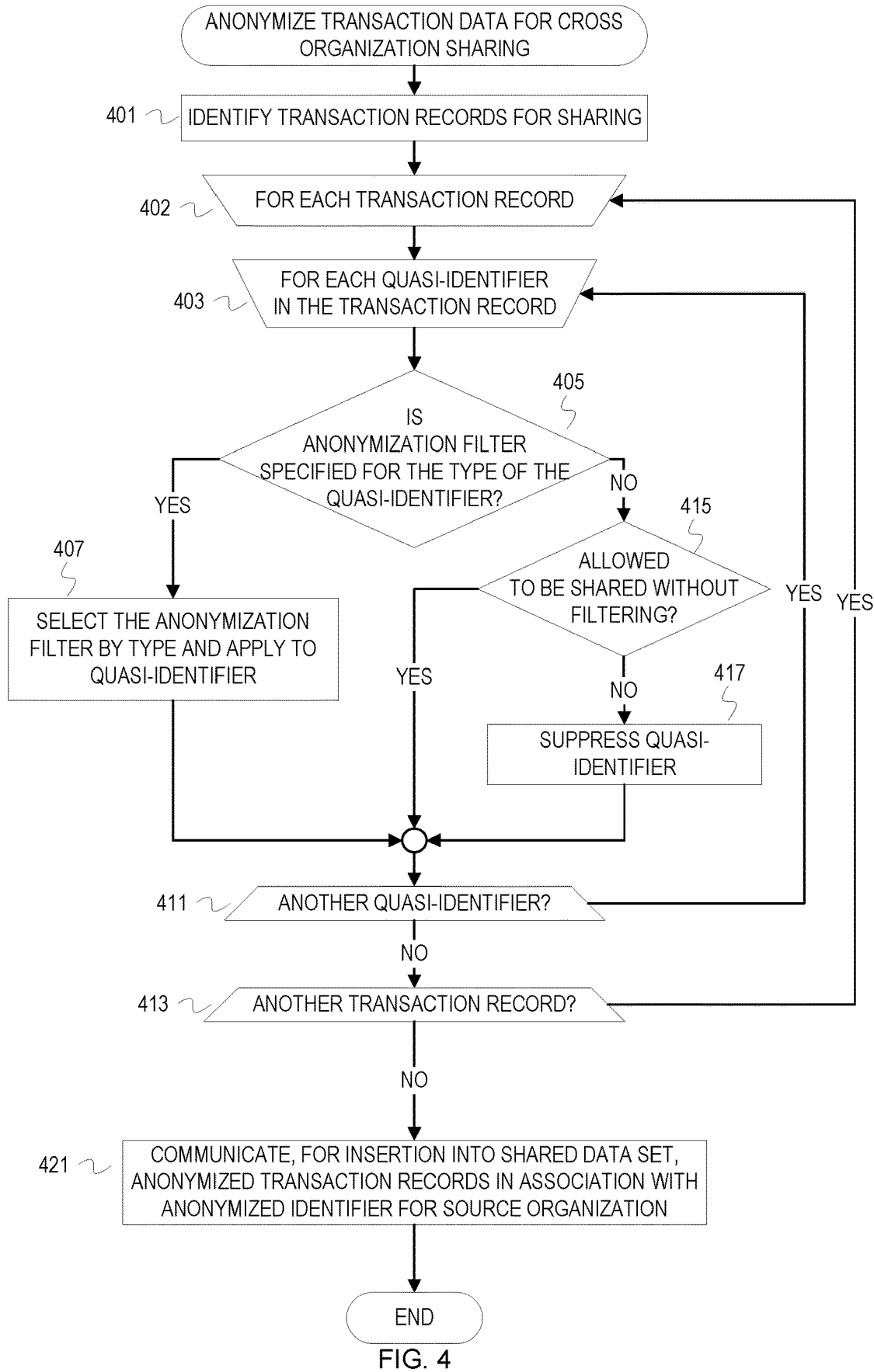
FIG. 4 is a flowchart of example operations for anonymizing transaction data for cross-organization sharing.

FIG. 4 is a flowchart of example operations for anonymizing transaction data for cross-organization sharing. FIG. 4 refers to a data anonymizer agent performing the example operations. Transaction records from member organization are anonymized and then communicated to the data sharing system or communicated to the data sharing system and then anonymized.

A data anonymizer agent or an organization identifies transaction records of an organization for sharing (401). A set of transaction records may be identified based on a schedule of periodic uploading of transaction records to the data sharing system. An organization can also identify transaction records based on a sharing policy (e.g., transactions of certain entities or related to certain items may be excluded).

For each of the identified transaction records, the data anonymizer agent applies type based anonymization of at least quasi-identifiers within the transaction records (402). The data anonymizer agent parses each transaction record to discover quasi-identifiers and anonymizes each discovered quasi-identifier based on a governing data privacy policy (403). As with other data, the data anonymizer agent can discover the quasi-identifiers based on structure (e.g., tags, field identifiers, or locations within a record) of the transaction records. If transaction records are unstructured, a data anonymizer agent can use heuristics and machine learning to determine whether an element of a transaction record is a quasi-identifier and the type of quasi-identifier. Based on quasi-identifier type, the data anonymizer agent determines whether an anonymization filter is specified for the type (405). Different filters can be specified for geographic information, spending amount, web browsing data, sale data, etc. If an anonymization filter is specified for the type of the quasi-identifier, then the data anonymizer agent selects the anonymization filter and applies it to the quasi-identifier (407). The selection and applying can be invocation of a function/method implementing a filter with a referential or literal passing of the quasi-identifier. As an example of anonymization filtering, a filter may be specified for sale data that replaces a sale amount with a range. A filter can be specified for an image type quasi-identifier that reduces resolution of the image or otherwise modifies the image quasi-identifier to reduce detail or precision.

If an anonymization filter is not specified based on type of the quasi-identifier, the data anonymizer agent determines whether the quasi-identifier is allowed to be shared without filtering (415). This indication can be in the filtering criteria or rule evaluated by the data anonymizer agent. For instance, a rule can be defined that prevents sharing of any quasi-identifier for which type cannot be determined or does not have a specified anonymization filter. If the quasi-identifier is not allowed to be shared, then the quasi-identifier is suppressed (417). The data anonymizer agent proceeds with processing the next quasi-identifier after filter, suppressing, or determining that the quasi-identifier can be shared without filtering (411), and then proceeds to the next transaction record (413).

After processing the transaction records, the anonymized transaction records are communicated for insertion into a shared data set (421). A data anonymizer agent may communicate the anonymized transaction records over a network (e.g., with a web-based application programming interface (API) call, a web service communication, a remote write, etc.). If the transaction records were transmitted to the data sharing system prior to anonymization, then the data anonymizer agent is running within the data sharing system and communicates the anonymized transaction records to another element of the data sharing system for insertion into a shared data set in a database, repository, store, etc. Although the source organization may be identified when the transaction records are communicated to the data sharing system, the transaction records are associated with an anonymized identifier of the source organization prior to ingest into the data sharing system to prevent leakage of the identifying information into the shared transaction data and/or prevent exposure of identifying source information to other organizational members. The data sharing system maintain different shared data sets based on data residing in or originating from different jurisdictions and/or for different "rings" of sharing organizations.

Figure 5:
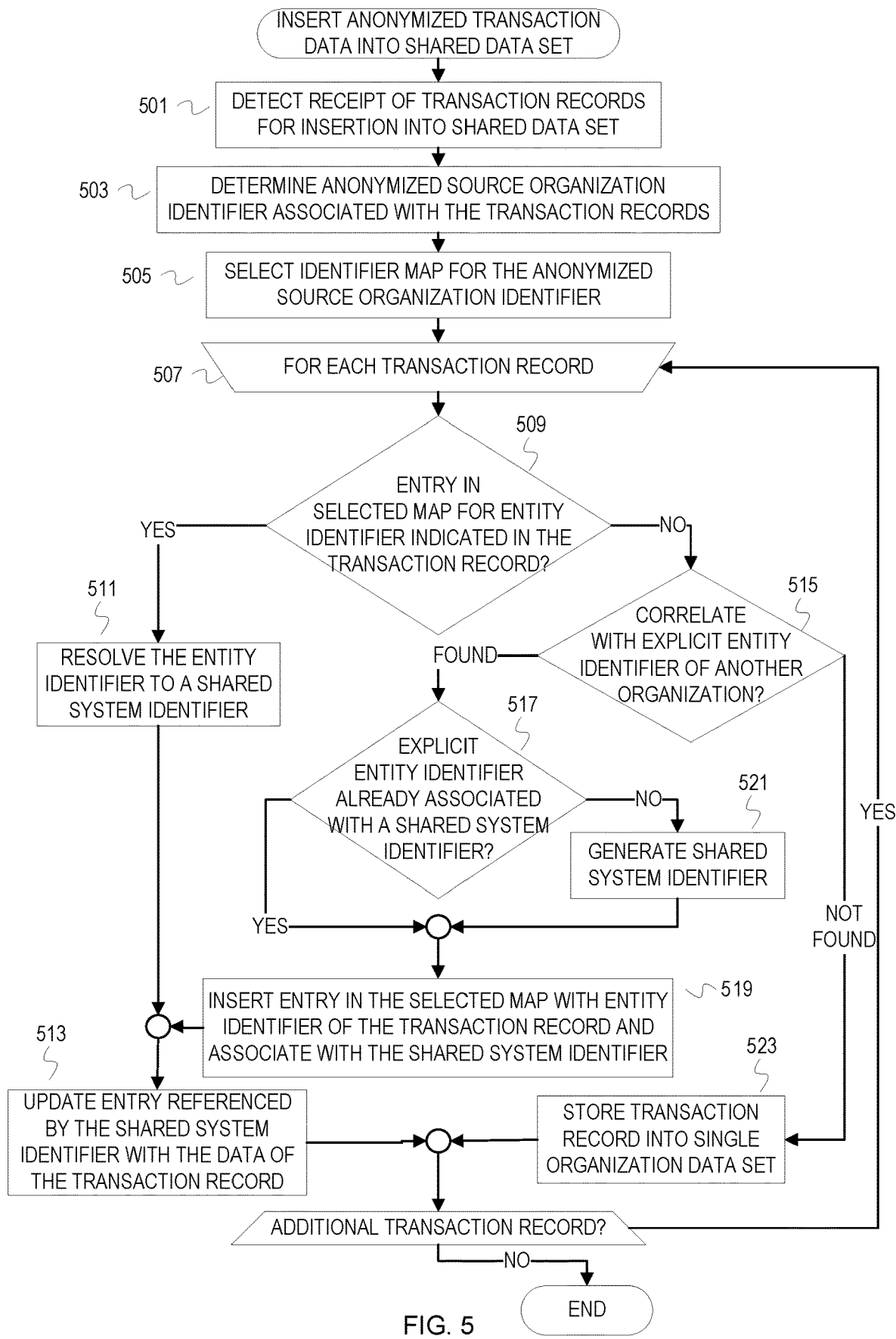
FIG. 5 is a flowchart of example operations for inserting anonymized transaction data into a shared data set.

FIG. 5 is a flowchart of example operations for inserting anonymized transaction data into a shared data set. FIG. 5 refers to an identifier resolver ("resolver") as performing the example operations for consistency with FIGS. 1 and 2. The identifier resolver can comprise database program code or have access to API calls of a database(s).

The resolver detects receipt of transaction records for insertion into a shared data set (501). The resolver can detect receipt by interruption, messaging, invocation, etc. For instance, the resolver may be invoked by another process with the transaction records passed literally or referentially. The resolver can be a running process that receives the transaction records or a reference to the transaction records via messaging, such as inter-process communication. When multiple shared data sets exist, the resolver can determine the target shared data set based on the anonymized source organization identifier associated with the transaction records and or a jurisdiction identifier. The resolver determines the anonymized source organization identifier associated with the transaction records (503) from the transaction records, metadata in an insertion request, etc. In addition to determining the target shared data set, the resolver uses the anonymized source identifier to select an identifier map (505). The identifier map comprises entity identifiers associated with the anonymized source identifier and the mappings from the entity records to internal identifiers. An entry in the map can be an entity record or an explicit identifier from the entity record. Whether a primary explicit identifier or a secondary explicit identifier is mapped to an internal identifier is dependent upon the previously performed correlation.

For each transaction record, the resolver inserts the transaction data of the transaction record into the target shared data set based on resolving an explicit entity identifier indicated in the transaction record to an internal identifier associated with an entry of the target shared data set (507). The resolver determines whether the selected map includes an entry for a user identifier indicated in the transaction record (509). The resolver searches the map for an identifier that matches the entity identifier indicated in the transaction record being processed. If a match is found, the resolver uses the map entry to resolve the indicated entity identifier to a shared system identifier (511) and then updates the shared data set entry associated with the shared system identifier with the transaction data of the transaction record (513).

If the resolver cannot find an entry in the map for the explicit entity identifier indicated in the transaction record (509), then the resolver invokes the correlator to attempt to correlate the indicated explicit entity identifier with another explicit entity identifier in an entity list of a different organization (515). If the correlator finds a matching explicit entity identifier, then the correlator determines whether the matching explicit entity identifier is mapped to a shared system identifier (517). If not, then the correlator generates a shared system identifier for both explicit entity identifiers (521). The correlator or resolver (or another element) can create or cause to be created an entry for the shared system identifier in the shared data set. With the generated shared system identifier or after determining the shared system identifier mapped to the matching explicit entity identifier, the correlator inserts an entry into the selected map with the explicit entity identifier mapped to the shared system identifier (519). If the matching entity identifier was not mapped to a shared system identifier (517), then the correlator can also update the map corresponding to the matching explicit entity identifier. The resolver can then update an entry associated with the shared system identifier with transaction data of the transaction record (513). If the correlator could not correlate the explicit entity identifier indicated in the transaction record (515), then the resolver stores the transaction record into a single organization data set (523). The data sharing system can separately maintain transaction records of entities belonging to only one member organization until the entity identifier is correlated with another organization. Thus, the transaction data can be later shared when the corresponding entity creates an account at another organization or a correlation is discovered. The resolver proceeds to a next transaction record after updating a shared data set entry or storing a transaction record into the single organization data set.

Figure 6:
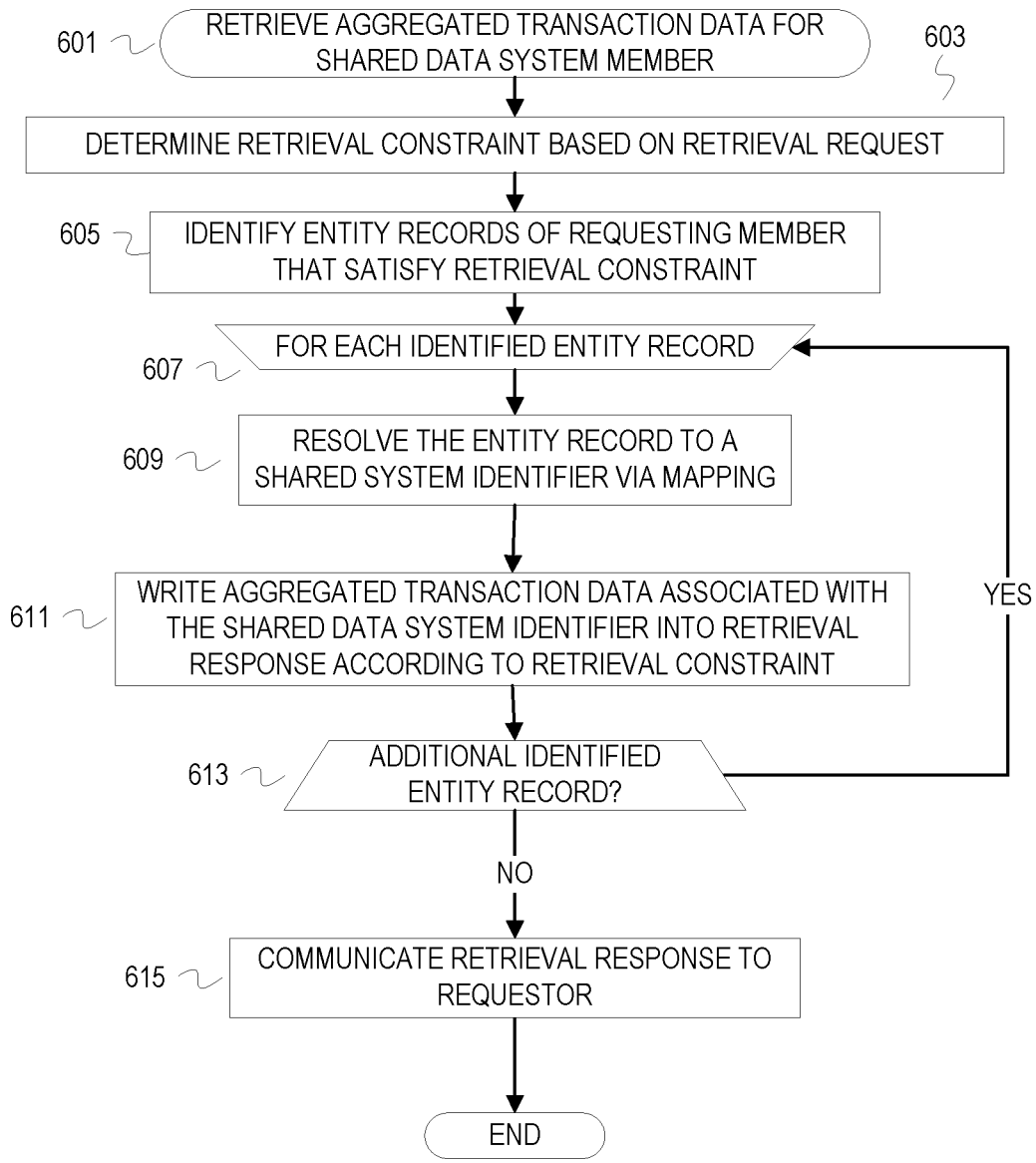
FIG. 6 is a flowchart of example operations for retrieving aggregated transaction data for data sharing system member.

FIG. 6 is a flowchart of example operations for retrieving aggregated transaction data for data sharing system member. The example operations are depicted as if based on receipt of a request from a shared data set member (i.e., an organization in a ring of sharing organizations) generally refer to the data sharing system as performing the operations. Depending upon implementation, different elements of the data sharing system can perform different operations (e.g., a database component performs database access operations, a network stack receives and parses requests and generates responses, etc.).

Based on receipt of a retrieval request from a data sharing system member, the data sharing system determines retrieval constraints based on the retrieval request (601). Retrieval will be constrained to a shared data set(s) of which the requestor is a member. The data sharing system will identify the target shared data set(s) based on an anonymized source organization identifier indicated in the request or an anonymized source organization identifier that maps to a requesting organization identifier. The retrieval request can specify criteria related to particular attributes of aggregated transaction data (e.g., specific entities, geographic origin of the data, time periods, etc.).

The data sharing system will populate a retrieval command with arguments corresponding to the determined retrieval constraints and identify entity records of the requesting member that satisfy the retrieval constraint(s) (605). The data sharing system limits the retrieval request to entities of the requesting member to avoid exposing transaction data of entities that are not known to the requesting member. Thus, the data sharing system will access the shared data set based on the identified entity records, which may be all of the entity records of the requesting member or a subset.

After identifying the entity records for which shared/aggregated transaction can be retrieved, the data sharing system begins retrieving the transaction data of each identified transaction record (607). The data sharing system resolves each identified entity record to a shared system identifier via the previously created correlation based mapping (609). The data sharing system identifier may be an index or key of the shared data set depending upon the implementation of the shared data set (e.g., relational database or non-relational database). The data sharing system writes the aggregated transaction data associated with the shared system identifier into a retrieval response (611). The data sharing system writes the aggregated transaction data according to the determined retrieval constraint(s). For instance, the data sharing system may skip data elements that do not satisfy the retrieval constraint. In some cases, there may be no constraint. Thus, the data sharing system will write the aggregated transaction data without suppression of data elements. The data sharing system proceeds with processing the next identified entity record (613). After the data sharing system has completed processing the identified entity records and constructing the retrieval response, the data sharing system communicates the retrieval response to the requestor.

Variations

FIG. 6 depicts example operations based on handling a single retrieval request as received. A data sharing system may queue retrieval requests until a condition is satisfied. For example, the data sharing system may queue retrieval requests received within a threshold time period prior to a pending upload from a defined number of member organizations. The data sharing system may also merge enqueued retrieval requests from a same organization, unless the requests correspond to different shared data sets. Entity is not necessarily an individual . . . people can share an account.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in FIG. 6 for processing each identified entity record can be performed in parallel. A thread can be spawned for each identified entity record to write the transaction data to a locked segment of a target file or separate locations to be merged into the retrieval response. FIG. 5 may perform additional operations to validate mappings and/or handle discrepancies. For instance, operations can be performed to increase confidence that entity records from different entity lists with intersecting identifiers correspond to a same entity. Since entity identifiers are provided by the entities and may be "fake" identifiers, different entities may create a same explicit identifier at different organizations. To increase confidence that an intersection set identifies a same entity, a data sharing system can examine other secondary explicit identifiers. For example, a data sharing system may not map entity records to a same shared system identifier unless at least two secondary explicit entity identifiers intersect or a secondary explicit identifier intersects with a primary explicit identifier. Furthermore, FIG. 5 may not perform an on-demand correlation as represented by example operation blocks 515, 517, and 521. Instead, a data sharing system can track entity records that lack mappings for later correlation. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Terminology

This disclosure refers to "mapping" and "maps." Both terms refer to associating or association of data elements or data structures, which can be done with various techniques. As previously mentioned, associating data elements can involve creating a reference to another data element with a memory address, path name, etc. Creating a map or mapping may be creation of a data structure with fields for the data elements being mapped to each other.

The disclosure also refers to an "entity." Although an organization may intend or design systems to maintain data about individual users, a primary explicit identifier provided by a "user" to an organization may actually correspond to multiple individuals (e.g., a family, a couple, etc.), a business, a social group, etc. For example, a family may use a same account for interacting with an online site to browse and/or purchase items. Therefore, the disclosure refers to an entity instead of a user.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
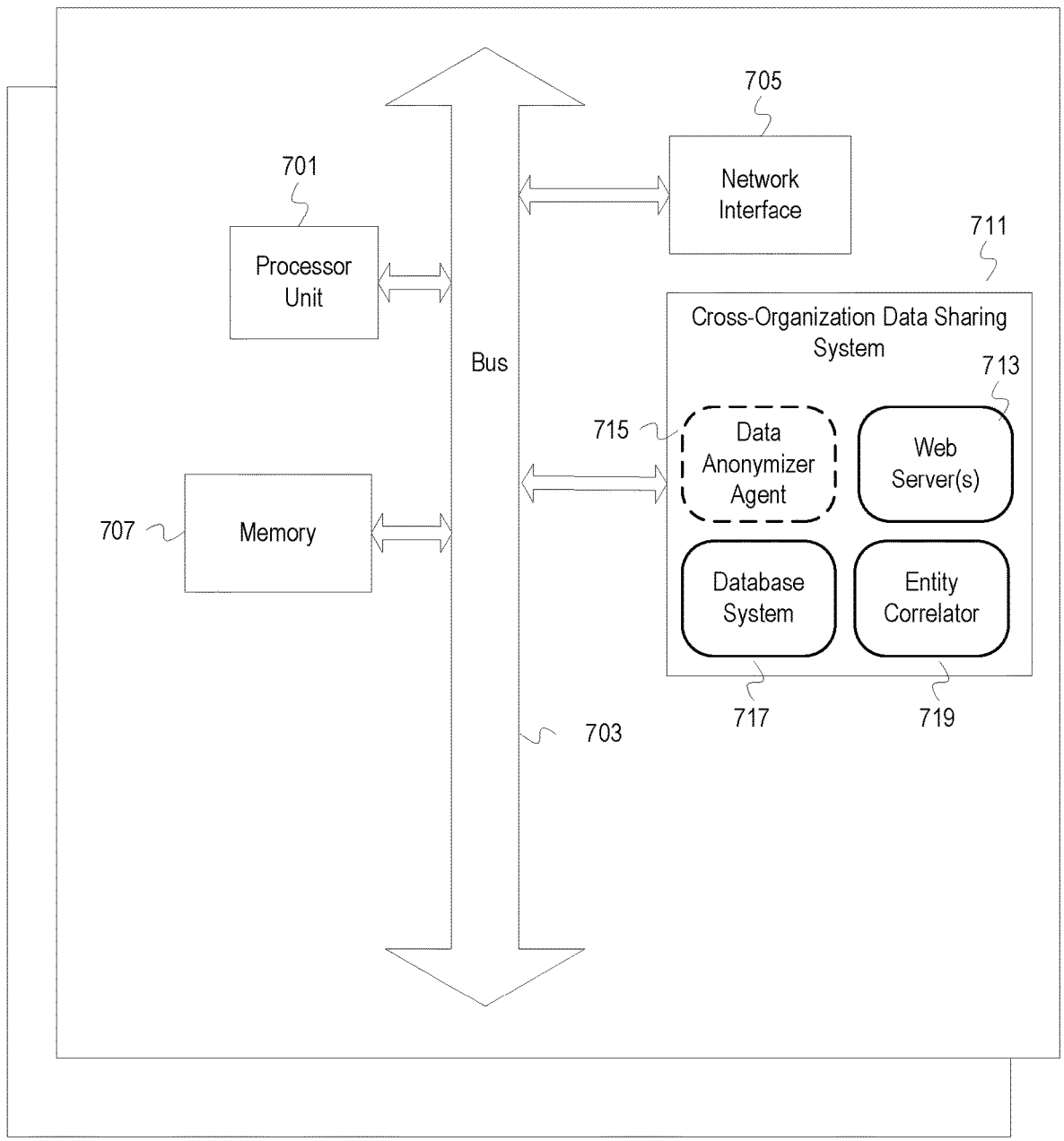
FIG. 7 depicts an example computer system(s) of a cross-organization data sharing system.

FIG. 7 depicts an example computer system(s) of a cross-organization data sharing system. The computer system includes a processor 701 (possibly including multiple processors, multiple cores, multiple nodes, and/or implementing multi-threading, etc.). The computer system includes memory 707. The memory 707 may be system memory (e.g., one or more of cache, random access memory, read-only memory, etc.) or any one or more of the above already described possible realizations of machine-readable media. The computer system also includes a bus 703 and a network interface 705 (e.g., a Fiber Channel interface, an Ethernet interface, an internet small computer system interface, SONET interface, wireless interface, etc.). The system also includes a cross-organization data sharing system 711. The data sharing system 711 anonymizes transaction data from different organizations that have agreed to share anonymized transaction data. In FIG. 7, the data sharing system 711 is depicted with multiple elements or components: a data anonymizer agent 715, a web server(s) 713, a database system 717, and an entity correlator 719. Although FIG. 7 depicts the data sharing system 711 on a single computer system, the data sharing system 711 is more likely distributed across multiple computing systems. Multiple computing systems can host an instance of a web server 713 to receive transaction record uploads, receive entity lists, receive retrieval requests, and communicate retrieval request responses. Multiple computing systems can host instances of the data anonymizer agent 715 (if not deployed at an organization's system). Instances of the entity correlator 719 can be distributed for various reasons (high availability, load balancing, etc.), but entity lists and correlations would be synchronized across these different host computing systems. Similarly, instances of the database system 717 can be distributed across multiple computing systems for a distributed database and for databases in jurisdictions with different data privacy laws. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for anonymizing and sharing transaction data across organizations while ensuring anonymity of the source organizations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    determining entity records across different entity record sets with matching entity identifiers;
    creating mappings from the entity records to cross-organization entity identifiers based, at least in part, on the determined matches;
    based on receipt of a first transaction record set associated with a first anonymized organization identifier;
        identifying a first set of the created mappings based, at least in part, on the first anonymized organization identifier;
        resolving first entity identifiers indicated in the first transaction record set to corresponding ones of a first subset of the cross-organization identifiers based on the first set of created mappings;
        updating entries associated with the first subset of the cross-organization identifiers with anonymized transaction data of the first transaction record set based on resolving the first entity identifiers;
    based on receipt of a second transaction record set associated with a second anonymized organization identifier;
        identifying a second set of the created mappings based, at least in part, on the second anonymized organization identifier;
        resolving second entity identifiers indicated in the second transaction record set to corresponding ones of a second subset of the cross-organization identifiers based on the second set of created mappings; and
        updating entries associated with the second subset of the cross-organization identifiers with anonymized transaction data of the second transaction record set based on resolving the second entity identifiers,
        wherein updating entries associated with the second subset of the cross-organization identifiers comprises aggregating anonymized transaction data of a transaction record of the second transaction record set with anonymized transaction data of a transaction record of the first transaction record set into a first entry based on an entity identifier of the first entity identifiers and an entity identifier of the second entity identifiers resolving to a same one of the cross-organization entity identifiers associated with the first entry.

2. The method of claim 1, wherein determining entity records across different entity record sets with matching entity identifiers comprises correlating entity records across different entity record sets based, at least in part, on intersecting of entity identifiers indicated in entity records across the different entity record sets.

3. The method of claim 2, wherein correlating comprises determining intersection of entity identifiers between entity records of different entity record sets, wherein an intersection of entity identifiers comprises matching between primary explicit identifiers of different entity record sets, matching between secondary explicit identifiers of different entity record sets, or matching between a primary explicit identifier and a secondary explicit identifier of different entity records.

4. The method of claim 3, wherein each of the entity records comprises a primary explicit identifier and at least one secondary explicit identifier.

5. The method of claim 1, wherein determining entity records across different entity record sets with matching entity identifiers comprises determining matching primary explicit identifiers between different entity record sets, wherein each of the entity record sets corresponds to a different organization.

6. The method of claim 1 further comprising anonymizing a first organization identifier associated with the first transaction record set to generate the first anonymized organization identifier, based on receipt of the first transaction record set.

7. The method of claim 1 further comprising anonymizing transaction data of the first transaction record set to generate the anonymized transaction data.

8. The method of claim 7, wherein anonymizing transaction data of the first transaction record set comprises:
   determining quasi-identifiers within each transaction record of the first transaction record set;
   for each of the quasi-identifiers,
      determining a type of the quasi-identifier;
      selecting from a plurality of anonymization filters based, at least in part, on the determined type; and
      anonymizing the quasi-identifier with the selected anonymization filter.

9. The method of claim 1 further comprising:
   based on receipt of a retrieval request, determining a set of the created mappings associated with an anonymized organization identifier indicated in the retrieval request;
   resolving the determined set of the created mappings to corresponding ones of the cross-organization entity identifiers; and
   retrieving anonymized transaction data associated based on resolving the determined set of the created mappings to corresponding ones of the cross-organization entity identifiers.

10. One or more non-transitory machine-readable media comprising program code for sharing transaction data across different source organization while preserving anonymity of the transaction data, the program code to:
   determine which entity records across different entity record sets have matching entity identifiers, wherein the entity identifiers comprise entity identifiers of different types;
   create a mapping from each plurality of the entity records determined to have matching identifiers to a different cross-organization identifier;
   for each transaction record in each of multiple transaction record sets,
      determine an entity identifier indicated in the transaction record of the transaction record set and resolve the indicated entity identifier to one of the cross-organization identifiers based, at least in part, on the created mappings; and
      update aggregated transaction data, identified with the one of the cross-organization identifiers to which the indicated entity identifier was resolved, with data of the transaction record.

11. The non-transitory machine-readable media of claim 10 further comprising program code to:
   access a first of the entity record sets corresponding to a source organization in response to receipt of a request associated with the source organization;
   resolve each entity record of the first entity record set to respective cross-organization identifiers with the created mappings; and
   supply aggregated transaction data identified with the cross-organization identifiers to which the entity records of the first entity record set resolved.

12. The non-transitory machine-readable media of claim 10 further comprising program code to anonymize transaction data received from the different source organizations and aggregate the anonymized transaction data by cross-organization identifiers.

13. An apparatus comprising:
   a processor; and
   a machine-readable medium having program code executable by the processor to cause the apparatus to,
      determine entity records across different entity record sets with matching entity identifiers;
      create mappings from the entity records to cross-organization entity identifiers based, at least in part, on the determined matches;
      based on receipt of a first transaction record set associated with a first anonymized organization identifier;
         identify a first set of the created mappings based, at least in part, on the first anonymized organization identifier;
         resolve first entity identifiers indicated in the first transaction record set to corresponding ones of a first subset of the cross-organization identifiers based on the first set of created mappings;
         update entries associated with the first subset of the cross-organization identifiers with anonymized transaction data of the first transaction record set based on resolving the first entity identifiers;
      based on receipt of a second transaction record set associated with a second anonymized organization identifier;
         identify a second set of the created mappings based, at least in part, on the second anonymized organization identifier;
         resolve second entity identifiers indicated in the second transaction record set to corresponding ones of a second subset of the cross-organization identifiers based on the second set of created mappings; and
         update entries associated with the second subset of the cross-organization identifiers with anonymized transaction data of the second transaction record set based on resolving the second entity identifiers,
      wherein program code to update entries associated with the second subset of the cross-organization identifiers comprises program code to aggregate anonymized transaction data of a transaction record of the second transaction record set with anonymized transaction data of a transaction record of the first transaction record set into a first entry based on an entity identifier of the first entity identifiers and an entity identifier of the second entity identifiers resolving to a same one of the cross-organization entity identifiers associated with the first entry.

14. The apparatus of claim 13, wherein the program code to determine entity records across different entity record sets with matching entity identifiers comprises program code executable by the processor to cause the apparatus to correlate entity records across different entity record sets based, at least in part, on intersecting of entity identifiers indicated in entity records across the different entity record sets.

15. The apparatus of claim 14, wherein the program code to correlate comprises program code executable by the processor to cause the apparatus to determine intersection of entity identifiers between entity records of different entity record sets, wherein an intersection of entity identifiers comprises matching between primary explicit identifiers of different entity record sets, matching between secondary explicit identifiers of different entity record sets, or matching between a primary explicit identifier and a secondary explicit identifier of different entity records.

16. The apparatus of claim 13, wherein program code to determine entity records across different entity record sets with matching entity identifiers comprises program code executable by the processor to cause the apparatus to determine matching primary explicit identifiers between different entity record sets, wherein each of the entity record sets corresponds to a different organization.

17. The apparatus of claim 13, wherein the machine-readable medium further comprise program code executable by the processor to cause the apparatus to anonymize a first organization identifier associated with the first transaction record set to generate the first anonymized organization identifier, based on receipt of the first transaction record set.

18. The apparatus of claim 13, wherein the machine-readable medium further comprise program code executable by the processor to cause the apparatus to anonymize transaction data of the first transaction record set to generate the anonymized transaction data.

19. The apparatus of claim 18, wherein the program code to anonymize transaction data of the first transaction record set comprises program code executable by the processor to cause the apparatus to:
  determine quasi-identifiers within each transaction record of the first transaction record set;
  for each of the quasi-identifiers,
    determine a type of the quasi-identifier;
    select from a plurality of anonymization filters based, at least in part, on the determined type; and
    anonymize the quasi-identifier with the selected anonymization filter.

20. The apparatus of claim 13, wherein the machine-readable medium further comprise program code executable by the processor to cause the apparatus to:
  based on receipt of a retrieval request, determine a set of the created mappings associated with an anonymized organization identifier indicated in the retrieval request;
  resolve the determined set of the created mappings to corresponding ones of the cross-organization entity identifiers; and
  retrieve anonymized transaction data associated based on resolving the determined set of the created mappings to corresponding ones of the cross-organization entity identifiers.

* * * * *